United States Patent [19]
Huber

[11] Patent Number: 5,794,879
[45] Date of Patent: Aug. 18, 1998

[54] VEHICULAR SEAT BELT RETRACTOR

[75] Inventor: Andreas Huber, Durlangen, Germany

[73] Assignee: TRW Occupant Restraint Systems GmbH, Alfdorf, Germany

[21] Appl. No.: 851,963

[22] Filed: May 6, 1997

[30] Foreign Application Priority Data

May 6, 1996 [DE] Germany ............... 296 08 209.0 U

[51] Int. Cl.$^6$ .................. B60R 22/41; B60R 22/415
[52] U.S. Cl. .................. 242/382.2; 242/383.1; 242/384.1
[58] Field of Search ............... 242/382.2, 383.1, 242/384.1; 280/806; 297/478

[56] References Cited

U.S. PATENT DOCUMENTS

| | | | |
|---|---|---|---|
| 4,164,335 | 8/1979 | Kondziola | 242/384.1 |
| 4,749,142 | 6/1988 | Saitow | 242/382.2 |
| 4,811,912 | 3/1989 | Takada | 242/382.2 |
| 5,474,247 | 12/1995 | Bareiss | 242/382.2 |
| 5,505,400 | 4/1996 | Boelstler et al. | 242/382.2 |
| 5,520,349 | 5/1996 | Kapanka et al. | 242/382.2 |

*Primary Examiner*—John M. Jillions
*Attorney, Agent, or Firm*—Tarolli, Sundheim, Covell, Tummino & Szabo

[57] ABSTRACT

A belt retractor comprises a belt reel rotatably mounted in a frame, a locking mechanism for selective blocking of belt reel rotation and an activating mechanism for the locking mechanism with a control disk restrictedly rotatable with respect to the belt reel. The locking mechanism is activated by rotation of the control disk relative to the belt reel. A planetary gear is provided which includes a sun wheel connected to the belt reel for joint rotation, an annular gear secured to the frame and at least one planet wheel having an external toothing mating with the sun wheel and the annular gear. The planet wheel has at least one switching cam. A switching toggle is mounted to swivel between a normal position and a locking position. The switching toggle is moveable into the locking position by the switching cam of the planet wheel to inhibit the activating mechanism.

6 Claims, 3 Drawing Sheets

VEHICULAR SEAT BELT RETRACTOR

The present invention relates to a vehicular seat belt retractor.

Typically, a seat belt retractor comprises a belt reel rotatably mounted in a frame, a locking mechanism for selective blocking of belt reel rotation and an activating mechanism for selective activation of the blocking mechanism. The activating mechanism typically has a control disk restrictedly rotatable with respect to the belt reel. The locking mechanism is activated by limited rotation of the control disk relative to the belt reel.

BACKGROUND OF THE INVENTION

Typically, the activating mechanism of such a belt retractor comprises a belt web sensitive part and a vehicle sensitive part. On belt removal and coiling of the belt web on the belt reel of the belt retractor an unwanted activation of the locking mechanism may occur when the belt web impinges the vehicle seat and the elasticity of the seating upholstry results in the belt web being briefly re-extended. An unwanted activation of the locking mechanism may also occur when the belt is removed whilst the vehicle is tilted.

To prevent such an unwanted locking action the activating mechanism may be deactivated with the belt web coiled almost completely. The amount of belt web coiled on the belt reel may be sensed by a sensor. However, if the belt web is soiled or if the coil of the belt web on the belt reel is out of round, fluctuations may occur as regards the amount of belt web coiled on the belt reel at which deactivation of the locking mechanism occurs.

OBJECT OF THE INVENTION

An object of the invention is to provide a belt retractor the locking mechanism of which is deactivatable with high accuracy and repeatability when a predetermined amount of belt web is coiled on the belt reel.

SUMMARY OF THE INVENTION

The present invention provides a belt retractor for vehicular seat belts. The retractor comprises a belt reel rotatably mounted in a frame, a locking mechanism for selective blocking of belt reel rotation and an activating mechanism for the locking mechanism with a control disk restrictedly rotatable with respect to the belt reel. The locking mechanism is activated by rotation of the control disk relative to the belt reel. A planetary gear is provided which includes a sun wheel connected to the belt reel for joint rotation, an annular gear secured to the frame and at least one planet wheel having an external toothing mating with the sun wheel and the annular gear. The planet wheel has at least one switching cam. A switching toggle is mounted to swivel between a normal position and a locking position. The switching toggle is moveable into the locking position by the switching cam of the planet wheel to inhibit the activating mechanism.

Due to the use of a planetary gear instead of a belt web sensor it is not the outer diameter of the belt web coil, that is prone to fluctations, which is sensed, but the angle of rotation of the belt reel and is employed as the criterion for deactivating the activating mechanism.

To deactivate the belt web sensitive part of the activating mechanism according to the preferred embodiment the switching toggle in its locked position results in a non-rotatable coupling of the control disk with the belt reel.

Since a relative rotation between belt reel and control disk is thus thwarted when the switching toggle is in its locked position no belt web sensitive activation can materialize.

For the vehicle sensitive part of the activating mechanism it is provided for in the preferred embodiment that the switching toggle in its locked position deactivates a sensor lever of a vehicle sensitive activating sensor.

When the belt retractor is also equipped with a child restraint which by means known as such serves to activate the locking mechanism of the belt retractor to define a child's seat locked in place on a vehicle seat, one and the same planetary gear is preferably used to activate the child restraint or to deactivate the locking mechanism (with the belt web practically fully coiled).

Further features and advantages of the invention will be evident from the following description of a preferred embodiment and from the drawing to which reference is made and in which.

Figure 1:
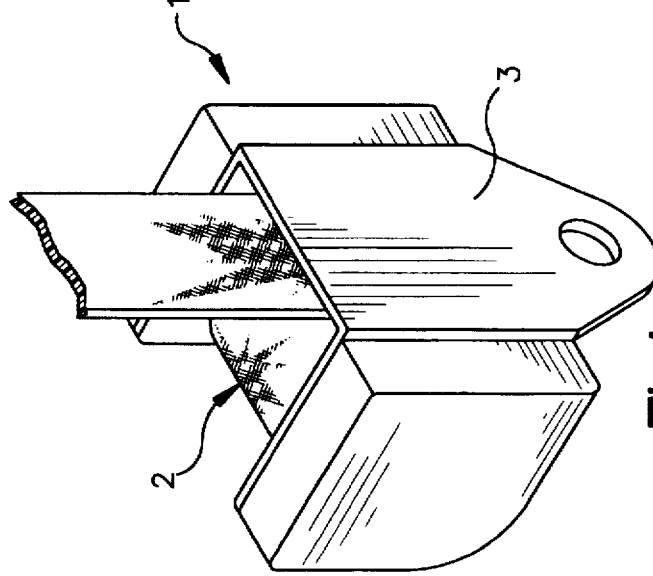
FIG. 1 shows a seat belt retractor.

FIG. 1 shows a belt retractor according to the invention. The belt retractor 1 comprises a belt reel 2 which is rotatably mounted between the legs of a U-shaped frame 3. Conventionally, a locking mechanism is provided which responds to a vehicle sensitive and belt web sensitive activating mechanism and locks up the belt reel 2 in an emergency.

Figure 3:
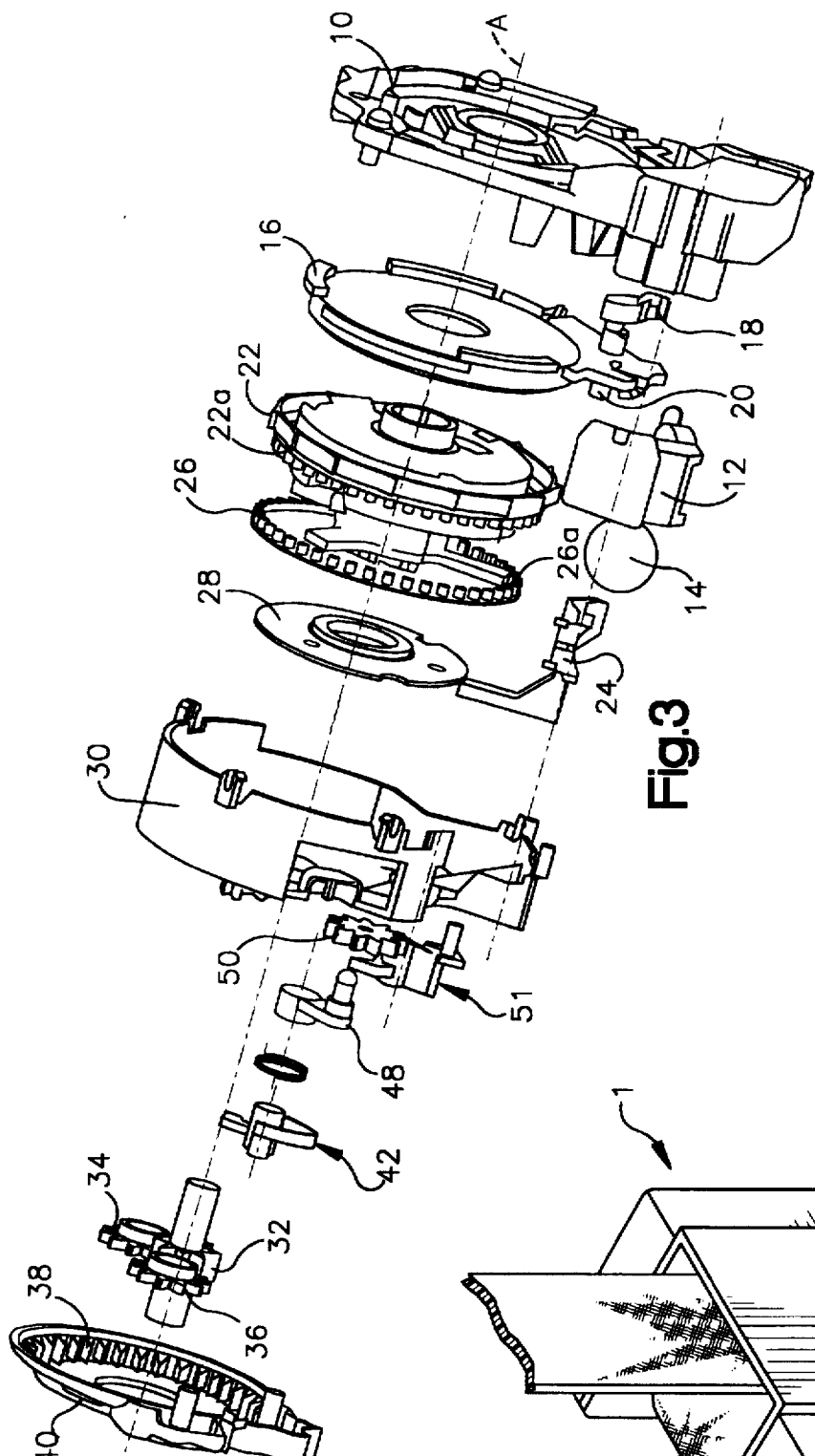
FIG. 3 is an exploded view of the control part of the belt retractor.
Figure 2:
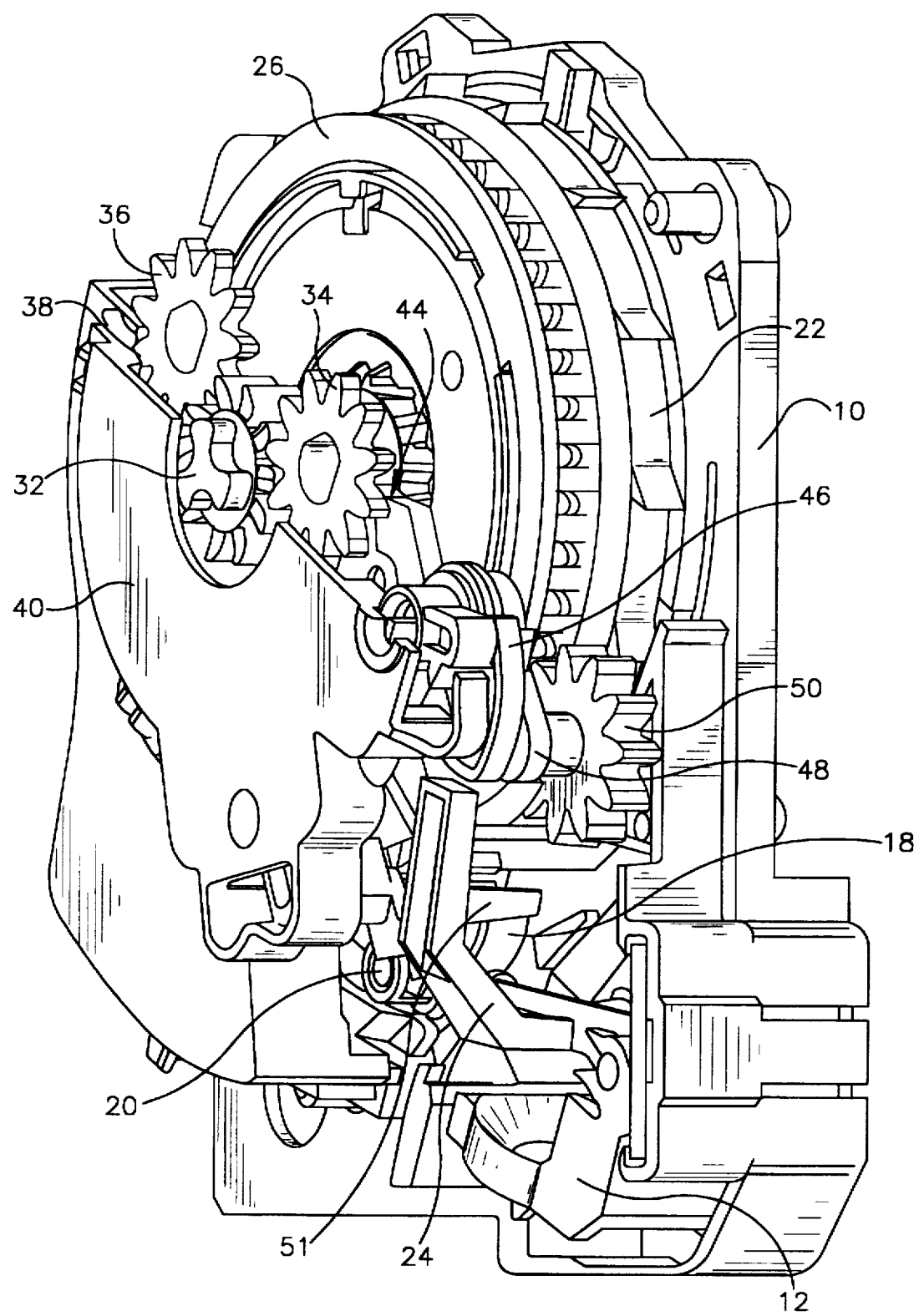
FIG. 2 is a cut-open perspective view of the control side of a belt retractor.

With reference to FIG. 2 and FIG. 3, side-mounted to the frame of the belt retractor is a sensor carrier plate 10 which receives a sensor housing 12 including a ball 14 located therein. Rotatably mounted about the axis A of the belt retractor is an actuating disk 16 on which an activating pawl 18 is swivably mounted at a cam 20. Rotation of the actuating disk 16 activates the locking mechanism by two load-bearing pawls being caused to engage locking gears on the belt reel of the belt retractor.

Non-rotatably connected to the belt reel of the belt retractor is a coupling disk 22. The coupling disk 22 has a toothing on its outer periphery with which a sensor lever 24 coacts, this lever being liftable by the ball 14 to cause the activating pawl 18 to engage the outer toothing on the coupling disk 22.

Restrictedly rotatable relative to the belt reel about the axis A is a control disk 26 which is non-rotatably coupled to an inertial disk 28. On their sides facing each other the coupling disk 22 and the control disk 26 each have an outer toothing 22a and 26a, respectively. These outer toothings 22a, 26a are of similar shape.

The actuating disk 16, the coupling disk 22 and the control disk 26 together with the inertial disk 28 are accommodated in the interior of a cover 30. On the outside of this cover 30 a planetary gear is arranged. This comprises a sun wheel 32 non-rotatably coupled to the belt reel of the belt retractor, two planet wheels 34, 36 and an internally toothed annular gear 38 formed in a cover cap 40.

The planet wheels 34, 36 are provided with switching cams or switching teeth.

Figure 4B:
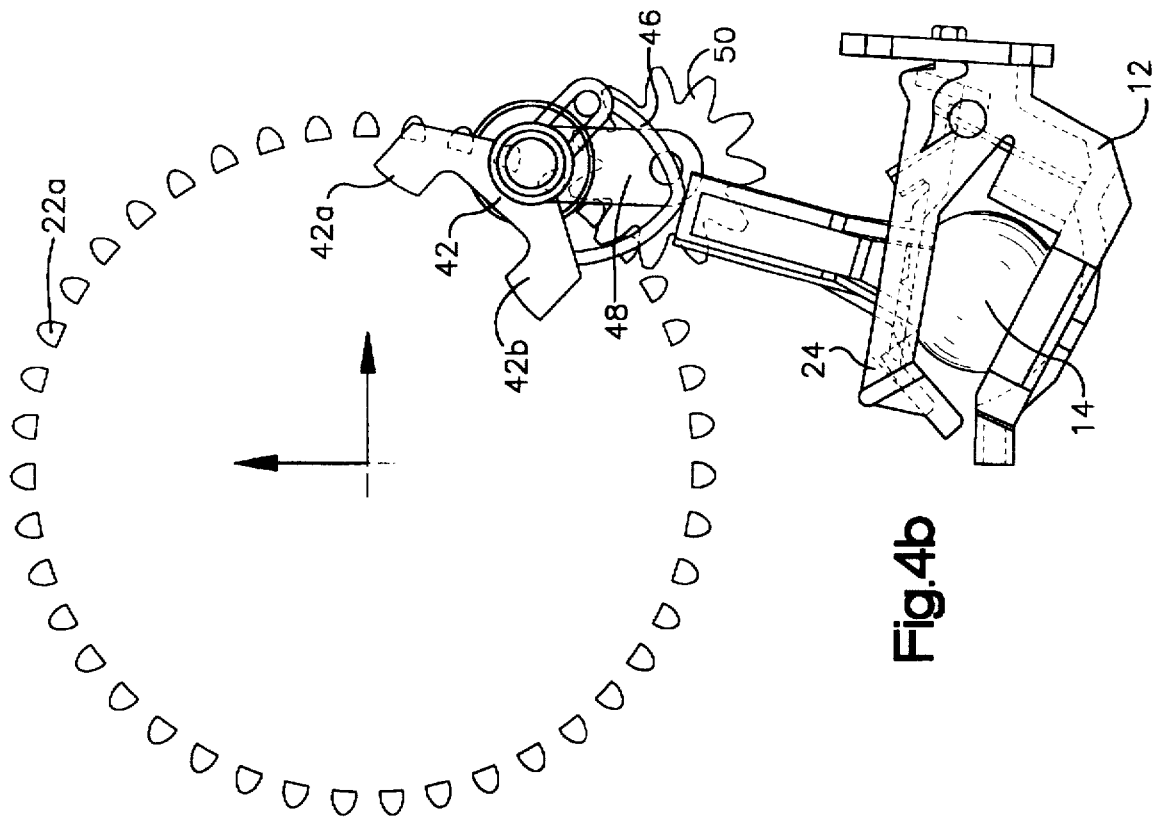
FIG. 4a and 4b show the switching conditions of a deactivating means for the locking mechanism of the belt retractor.
Figure 4A:
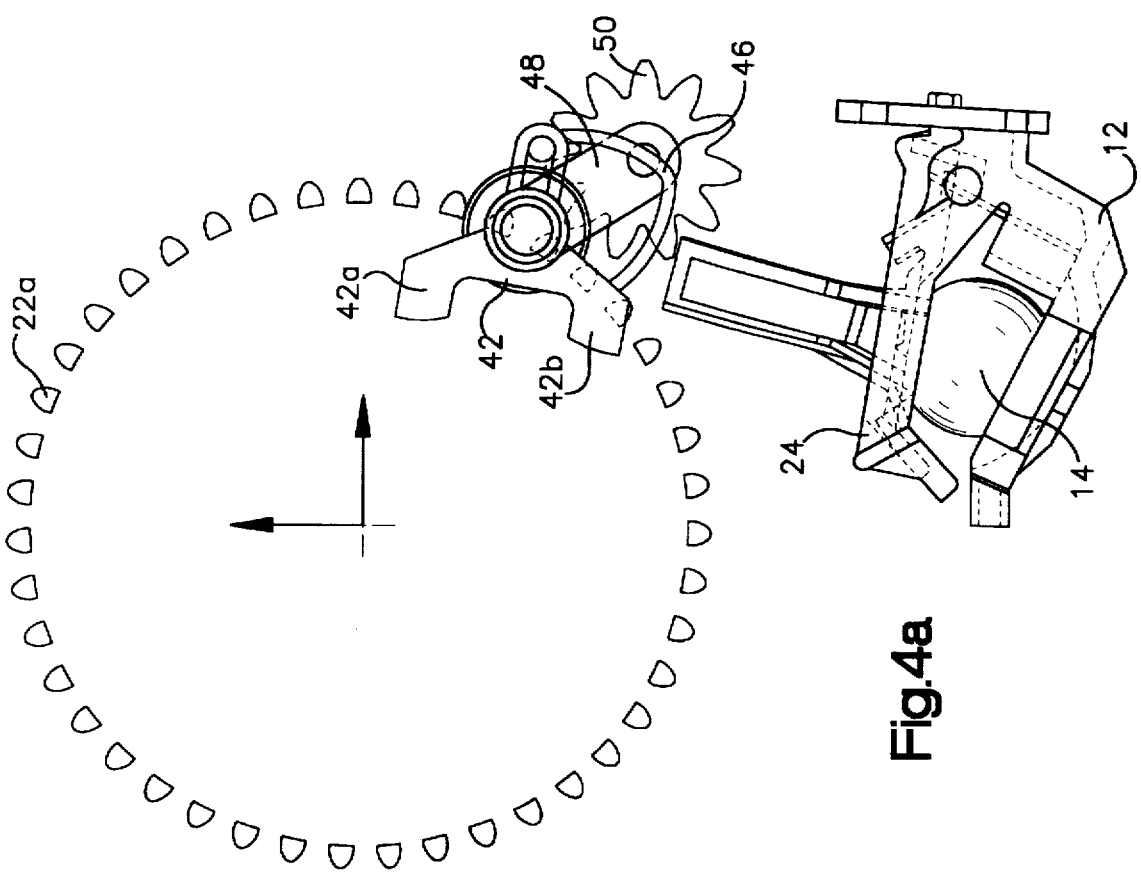

A first switching toggle 42 is able to assume two stable switching positions which are illustrated in FIGS. 4a and 4b.

Toggle 42 comprises two actuating arms 42a, 42b which come into contact with switching cams on the planet wheels when a specific angle of rotation of the belt reel is attained. In FIG. 2 a first switching cam 44 on planet wheel 34 and a second switching cam 45 on planet wheel 36 are shown. When a switching cam comes into contact with one of the actuating arms 42a, 42b the switching toggle 42 is changed over to the other position in each case.

The switching toggle 42 carries an arcuate switching arm 46 and is coupled to a swivel arm 48 at the free end of which a gearwheel 50 is rotatably mounted. In the switching position of the switching toggle 42 shown in FIG. 4a, the swivel arm 48 maintains the gearwheel 50 out of engagement with the outer tooghings of coupling disk 22 and control disk 26. In the switching position shown in FIG. 4b, the gearwheel 50 meshes simultaneously with the two outer toothings of the coupling disk 22 and of the control disk 26 so that these are coupled to each other for joint rotation. At the same time the switching arm 46 presses against a raised face of the sensor lever 24, maintaining it in a lowered position.

A second switching toggle 51 is also swivable between two stable switching positions. The switching toggle 51 is likewise actuated by control cams on the planet wheels 34, 36. In the one switching position this switching toggle 51 activates the locking mechanism of the belt retractor by it lifting the activating pawl 18. In the other switching position the switching toggle 51 releases the activating pawl 18 enabling it to be actuated vehicle-sensitive by the ball 14 and the sensor lever 24.

In a normal driving situation with the seat belt buckled the switching toggle 42 is in the normal position shown in FIG. 4a. The switching toggle 51 is also in a normal position in which it releases the sensor lever 24. In this condition the locking mechanism of the belt retractor is activatable both vehicle-sensitive and webbing-sensitive.

On belt removal the belt web is coiled on the belt reel. At a specific angle of rotation of the belt reel, corresponding to the practically fully coiled belt web, the switching cam 44 comes up against the actuating arm 42a of the switching toggle 42 so that the latter is swivelled into the switching position shown in FIG. 4b. In this position the coupling disk 22 and the control disk 26 are coupled to each other non-rotatably by the gearwheel 50. Belt sensitive activation of the locking mechanism is thus disabled. Vehicle sensitive activation is also disabled since the sensor lever 24 is held down by the switching arm 46. Accordingly, an unwanted locking of the belt reel in this condition is thus reliably prevented.

Changeover of the switching toggle 42 into the normal position shown in FIG. 4a is done by a further switching cam on one of the planet wheels 34, 36 as soon as a predetermined amount of belt web is uncoiled from the belt reel.

The second switching toggle 51 serves to make the change of the belt retractor into the so-called automatic locking mode needed for child seat or load security. This operating mode of the belt retractor is activated by the belt web being uncoiled practically completely from the belt reel and then recoiled. In this action one of the control cams on the planet wheels 34, 36 comes up against an actuating arm on the switching toggle 51 and causes it to swivel so that it lifts the sensor lever 24, the belt web then being recoiled until it is in contact with the child seat or load to be secured. When an attempt is made to uncoil the belt web the locking mechanism of the belt retractor is activated via the actuating disk 16, a repeat changeover of the switching toggle 51 not occurring until the belt web has been practically completely recoiled by a further control cam of the planet wheels 34, 36 coming up against the switching toggle 51.

I claim:

1. A belt retractor for vehicular seat belts comprising
    a belt reel rotatably mounted in a frame;
    a locking mechanism for selective blocking of belt reel rotation; and
    an activating mechanism for said locking mechanism with
        a control disk restrictedly rotatable with respect to the belt reel, the locking mechanism being activatable by rotation of said control disk relative to said belt reel;
        a planetary gear including a sun wheel connected to said belt reel for joint rotation, an annular gear secured to said frame and at least one planet wheel having an external toothing mating with said sun wheel and said annular gear, said planet wheel having at least one switching cam; and
        a switching toggle mounted to swivel between a normal position and a locking position, said switching toggle being moveable into said locking position by said switching cam of said planet wheel to inhibit said activating mechanism.

2. The belt retractor as set forth in claim 1, wherein said switching toggle couples said control disk to said belt reel for joint rotation when in said locking position.

3. The belt retractor as set forth in claim 2, wherein a gearwheel is mounted for free rotation on a pivoting arm, a coupling disk is rigidly connected to said belt reel, said coupling disk and said control disk both having an outer toothing, and said switching toggle, when in said locking position, causes said gearwheel to mesh simultaneously with said outer toothing of said control disk and said outer toothing of said coupling disk to connect said control and coupling disks for joint rotation.

4. The belt retractor as set forth in claim 1, wherein a vehicle sensitive activating sensor with a sensor lever is provided and said switching toggle in its locking position deactivates said sensor lever.

5. The belt retractor as set forth in claim 1, wherein a pair of planet wheels are provided, each planetary wheel having a switching cam, and wherein said switching toggle comprises two actuating arms and is moved into said locking position by one switching cam coming into contact with one of said actuating arms and is moved back into the normal position by another switching cam coming into contact with the other of said actuating arms.

6. The belt retractor as set forth in claim 1, wherein a further switching toggle with two stable switching positions is provided which in a first one of said switching positions enables said locking mechanism and in a second one of said switching positions permits activation of said locking mechanism by said activating mechanism, said further switching toggle being controlled by switching cams on said at least one planet wheel.

* * * * *